(12) United States Patent
Yang et al.

(10) Patent No.: US 11,142,291 B2
(45) Date of Patent: *Oct. 12, 2021

(54) FLOATING PLATFORM WITH CANTED COLUMNS

(71) Applicants: Zhiyong Yang, Katy, TX (US); Tingting Li, Katy, TX (US); Nan Feng, Katy, TX (US); Yumin Yang, Katy, TX (US)

(72) Inventors: Zhiyong Yang, Katy, TX (US); Tingting Li, Katy, TX (US); Nan Feng, Katy, TX (US); Yumin Yang, Katy, TX (US)

(73) Assignee: ARGUS MARINE SOLUTIONS, LLC, Katy, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/907,152

(22) Filed: Jun. 19, 2020

(65) Prior Publication Data

US 2020/0317306 A1  Oct. 8, 2020

Related U.S. Application Data

(63) Continuation-in-part of application No. 16/243,047, filed on Jan. 8, 2019, now Pat. No. 10,766,578.

(51) Int. Cl.
   *B63B 35/44* (2006.01)
   *F03D 9/30* (2016.01)
   *B63B 75/00* (2020.01)

(52) U.S. Cl.
   CPC .............. *B63B 35/44* (2013.01); *B63B 75/00* (2020.01); *F03D 9/30* (2016.05); *B63B 2035/446* (2013.01)

(58) Field of Classification Search
   CPC ..... B63B 35/00; B63B 35/44; B63B 35/4413; B63B 21/00; B63B 21/50; B63B 21/502;
   (Continued)

(56) References Cited

U.S. PATENT DOCUMENTS

| | | | |
|---|---|---|---|
| 8,087,849 B2 * | 1/2012 | Leverette | B63B 35/4413 114/264 |
| 10,716,296 B2 * | 7/2020 | Zheng | B63B 35/44 |
| 10,766,578 B2 * | 9/2020 | Li | B63B 35/4413 |

FOREIGN PATENT DOCUMENTS

| | | |
|---|---|---|
| CN | 105705415 A | 6/2016 |
| CN | 107690405 A | 2/2018 |

OTHER PUBLICATIONS

Mar. 17, 2021 PCT International Search Report, International Application No. PCT/IB2020/056394.

(Continued)

*Primary Examiner* — Lars A Olson
(74) *Attorney, Agent, or Firm* — Law Offices of Albert Wai-Kit Chan, PLLC (57) ABSTRACT

This invention provides a floating platform with canted columns, and a new method of mooring line makeup and installation method that can be used for the canted columns. In one embodiment, the platform includes 3 columns having upper ends projecting above water surface. The columns are canted or inclined inward from the corner of hull toward the top of column. The 3 columns converge at the top of column such that each column will lean against the other 2 columns. Each column connects to the other 2 columns. Horizontally disposed pontoons interconnect adjacent columns at the lower ends. The columns and pontoons form a closed structure hull to support a foundation structure directly above the top of column.

20 Claims, 14 Drawing Sheets

(58) Field of Classification Search
CPC ....... B63B 39/00; B63B 39/005; B63B 75/00;
B63B 2035/446; F03D 9/30
USPC ........................................ 114/264, 265, 267
See application file for complete search history.

(56) References Cited

OTHER PUBLICATIONS

Mar. 17, 2021 PCT Written Opinion, International Application No. PCT/IB2020/056394.

* cited by examiner

FLOATING PLATFORM WITH CANTED COLUMNS

The present application is a continuation-in-part of U.S. application Ser. No. 16/243,047 filed on Jan. 8, 2019, the disclosure of which is hereby incorporated by reference in its entirety. Throughout this application, various publications are referenced. Disclosures of these publications in their entireties are hereby incorporated by reference into this application in order to more fully describe the state of the art to which this invention pertains.

FIELD OF THE INVENTION

This invention relates to floating platforms, particularly floating platforms with small footprint topsides.

BACKGROUND OF THE INVENTION

There are floating platforms with small footprint topsides, such as wind turbine platforms. The platforms are with vertical columns. The vertical columns provide stability of the platforms. U.S. Pat. No. 8,196,539 Battered Column Offshore Platform shows a semisubmersible with battered columns One embodiment of the invention is a semisubmersible with 3 columns. It is connected at column bottom by pontoons and decks on the column top. In the invention, the battered columns and pontoons form an open hull to support the deck. The columns do not converge to a central location to connect with each other. This open hull can provide support to a deck with large surface area. Large area in a deck is important for offshore oil and gas production or drilling units, since large quantities of equipment and facilities for these topsides require a large surface area in a deck. However, for a wind turbine platform or a platform with small footprint topsides, this requirement is no longer valid.

SUMMARY OF THE INVENTION

This invention provides a new platform shape. The concept is different from prior arts such as a battered column semisubmersible for oil and gas platform. The advantage of using canted columns converging to a central location over prior art is that it eliminates the deck structure or reduces the supporting span of deck structure, which was critical to offshore oil and gas facilities, by using the columns to directly support topsides or turbines and its foundation. The overall structure weight and VCG are reduced so that the platform is hydrostatically stable with topsides or wind turbines installed at quayside. This eliminates the need of offshore integration of wind turbines with hulls at the work site.

Traditional platforms have very small inclination or no inclination in the column structure. The mooring lines have to departure at a certain angle to avoid interfering with the hull structure. For the canted column structures of this invention, due to inclination, the column inclination and pontoon side forms an angle. The mooring line's departure angle is not necessarily the same as column inclination angle and, therefore, traditional fairlead will not function. In one embodiment, this invention provides a fairlead having one additional wheel to allow lines to make one more turn before departure similar to traditional mooring lines. This additional wheel enables the mooring lines to work properly for inclined column structure.

In one embodiment, the platform of this invention has 3 columns. The mooring system of the platform contains mooring lines (chain, chain/wire, or chain/rope) with fixed length on two of the 3 columns No line tensioning device such as mooring winch or chain jacks are used on these lines. Mooring lines on the third column contain line tensioning device including but not limited to in line tensioner that can be used to adjust mooring line length to tension up the mooring lines or adjust mooring line tension for various purposes including synthetic rope creep management.

In one embodiment, there could be no fairleads, mooring winches or chain jacks.

Figure 10:
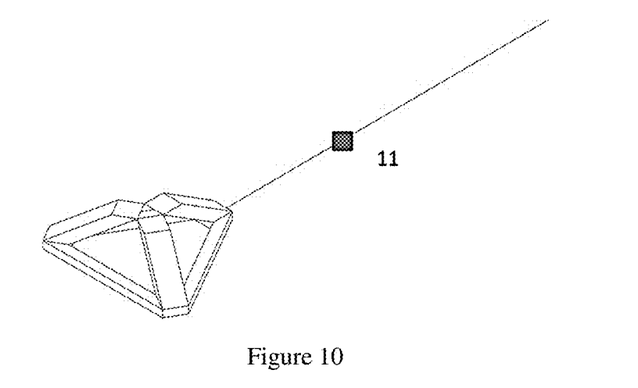
FIG. 10 shows the first mooring line installed on a floating platform with mooring connectors.
Figure 12:
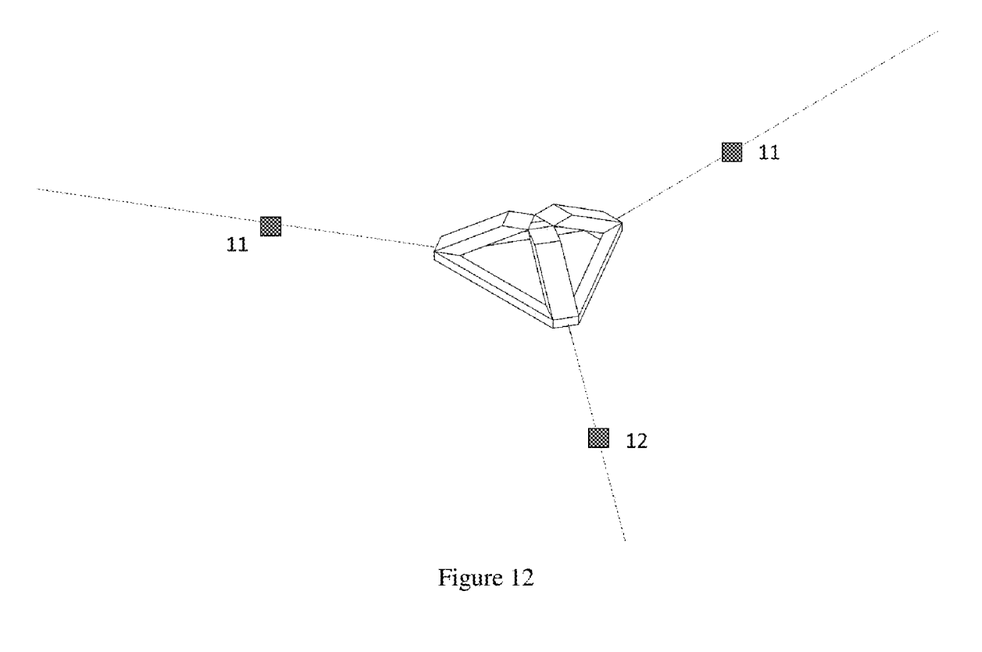
FIG. 12 shows the third mooring line installed on a floating platform with special in line mooring tensioner or similar mooring connectors.

In one embodiment, this invention provides a method to install the above mentioned platform comprising the steps of: Step 1: mooring the said platform using connection devices including but not limited to mooring connectors on one column first. FIG. 10 shows mooring connector 11 being used. The length of lines is pre-determined. Step 2: continue mooring of lines on another column with connection devices including but not limited to mooring connectors. The length of lines is pre-determined. Step 3: After lines are installed for 2 columns, tensioning devices including but not limited to in-line mooring tensioners or other tensioner such as Stevtensioner are used for lines on the remaining column to tension up all of the lines. FIG. 12 shows the last mooring line installation with in line tensioner 12. The length of lines is determined by as designed line length at pretension level plus additional length for pulling force above pretension level. Step 4: check line tensions in all lines to make sure they are to pretension requirement.

A wind platform can work fine with the above mentioned method, without chain jacks or mooring winch onboard the platform, since the frequent changing of mooring length or change of platform position is not necessary. However, traditional oil and gas drilling or production units cannot use this method due to the fact that constant changing of mooring length may be required.

DETAILED DESCRIPTION OF THE INVENTION

Figure 1:
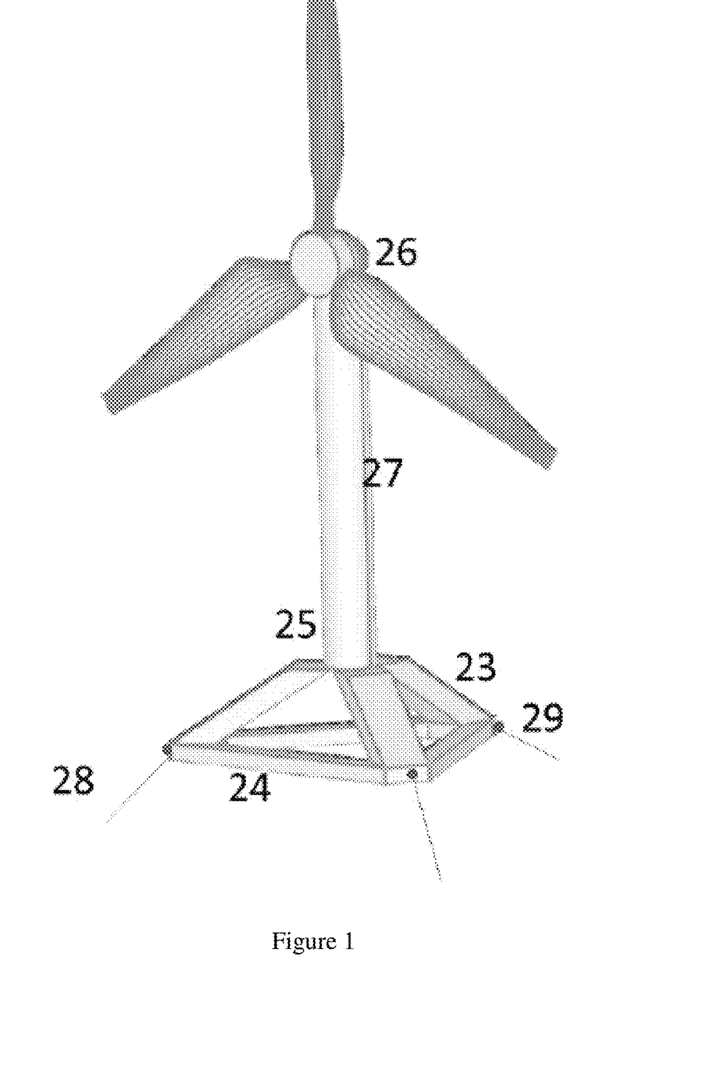
FIG. 1 is an isometric view of a floating platform (a three-column hull is shown in the drawing but the hull can have three or more columns of any shape).
Figure 2:
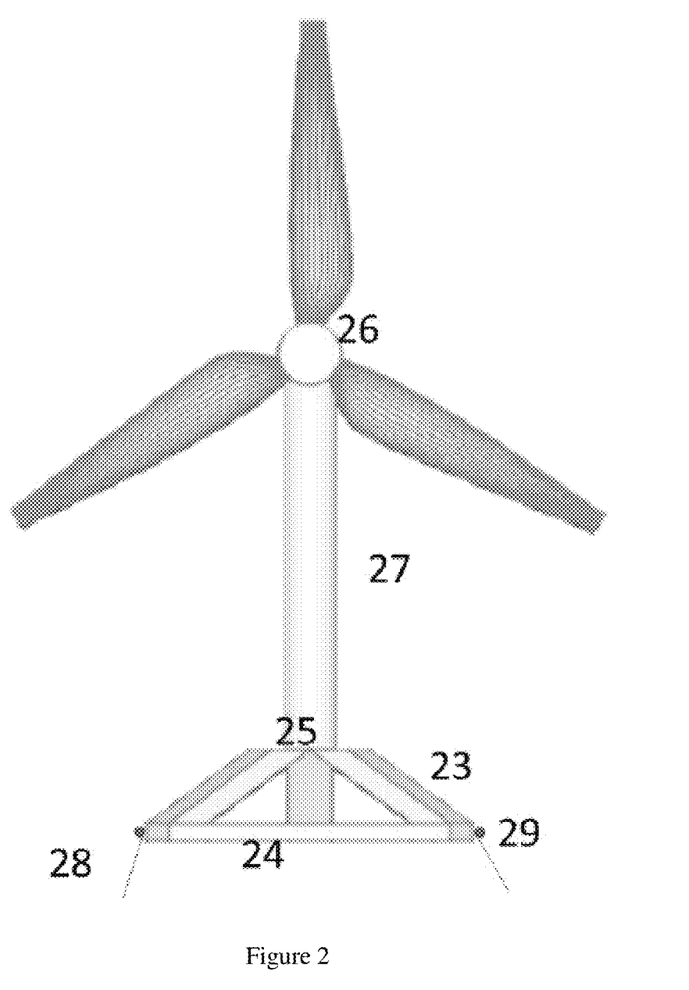
FIG. 2 is an elevation view of the platform.
Figure 3:
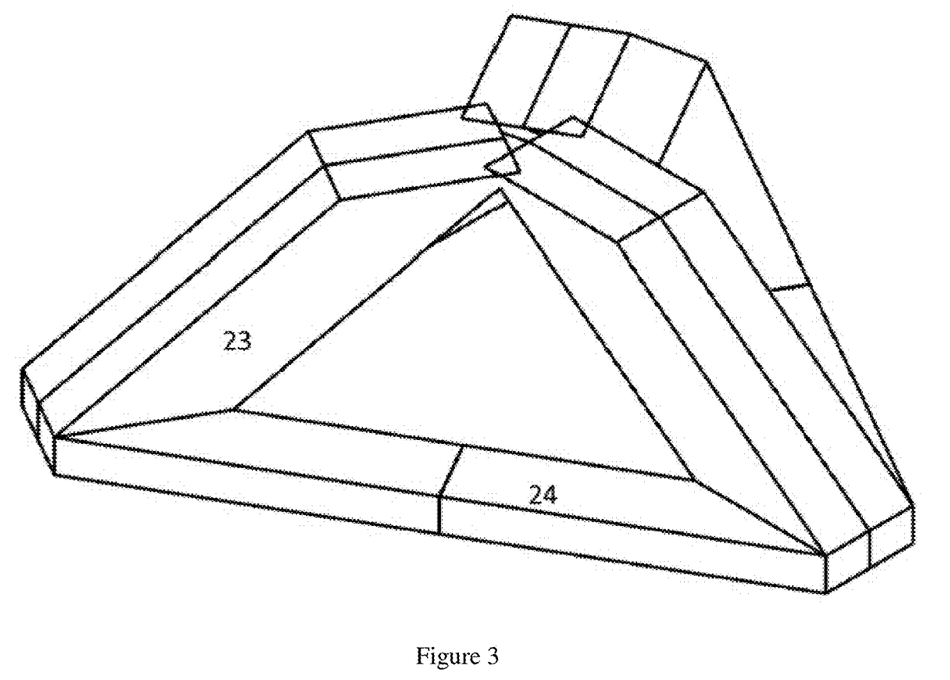
FIG. 3 is an isometric view of the platform without topsides, wind turbine, or mooring.
Figure 4:
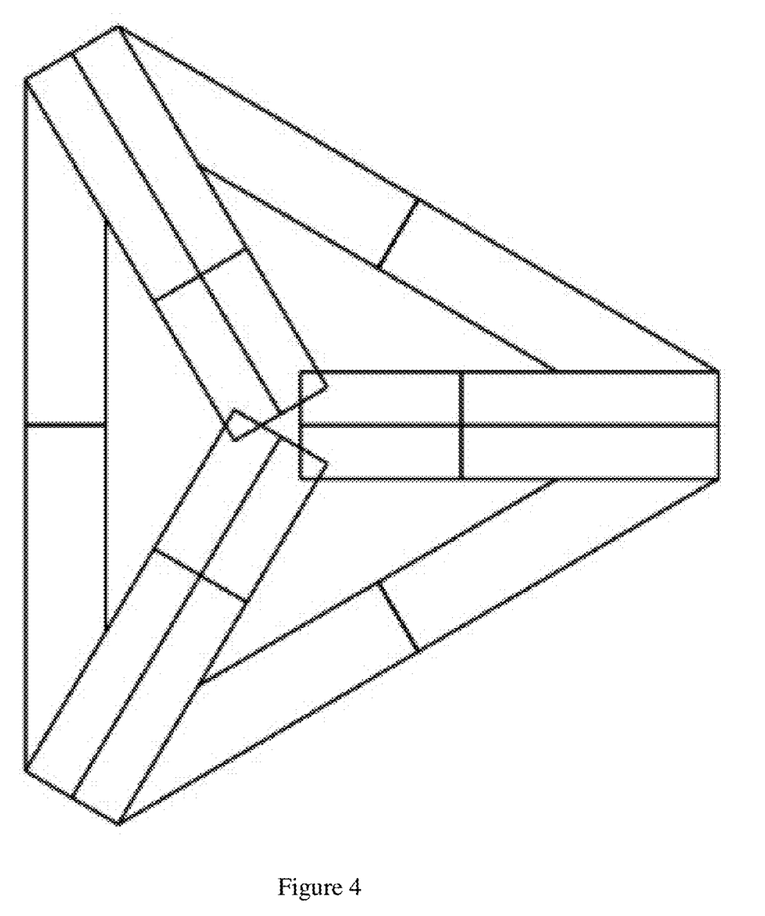
FIG. 4 is a top plan view of the platform without topsides, wind turbine, or mooring.

This invention provides a floating platform. In one embodiment, the floating platform of this invention comprises pontoon shape 24 and column 23. In one embodiment, the platform can comprise 3 pontoons as shown in FIG. 1 and FIG. 2, or 4 pontoons, or more pontoons that are not shown in the figures. The pontoon can be square, rectangular, or cylindrical, or other shapes. The column can be square, rectangular, or cylindrical, or other shapes. FIG. 1 shows rectangular pontoons and rectangular columns. On the top, there is foundation 25 supporting a turbine 26. The foundation 25 could be a truss type or box shape structure supporting turbine 26 and tower 27. The foundation 25 could be a pole supporting wind turbine 26, a deck structure supporting equipment, or other devices. Mooring lines 28 are shown to illustrate the station keeping. This can be catenary, taut, or even vertically tensioned up. It is attached to fairlead 29 on the hull. FIGS. 3 and 4 do not show any actual wind turbines or other devices for clarity, but the intention is to support the above mentioned topsides. Material can be steel, or concrete, or a combination of both.

In one embodiment, the floating platform of this invention comprises pontoon 24 and column 23. In one embodiment, the platform can comprise 3 pontoons as shown in FIG. 1 and FIG. 2. In said platform, FIG. 1 shows rectangular pontoons and rectangular columns. On the top, there is foundation 25 supporting a wind turbine 26. The foundation 25 could be a truss type, a box shape, or a substantially cylindrical shape structure supporting turbine 26 and tower 27. The foundation 25 could be used to support a wind turbine 26, a deck structure supporting equipment, or other devices. Mooring line 28 is shown to illustrate the station keeping. This can be catenary, taut, or even vertically tensioned up. FIG. 3, FIG. 4, FIG. 5, and FIG. 6 do not show any actual wind turbines or other devices for clarity, but the intention is to support the above mentioned topsides. The column 23 or pontoon 24 in the foundation 25 can be made of a material such as steel, or concrete, or a combination of both.

In one embodiment, the floating platform of this invention comprises pontoon 24 and column 23. In one embodiment, the platform can comprise 4 pontoons and 4 columns. On the top, there is foundation 25 supporting a wind turbine 26. The foundation 25 could be a truss type, a box shape, or a substantially cylindrical shape structure supporting turbine 26 and tower 27. The foundation 25 could be used to support a wind turbine 26, a deck structure supporting equipment, or other devices. Mooring line 28 is shown to illustrate the station keeping. This can be catenary, taut, or even vertically tensioned up. FIGS. 3 and 4 do not show any actual wind turbines or other devices for clarity, but the intention is to support the above mentioned topsides. Material can be steel, or concrete, or a combination of both.

In one embodiment, the floating platform of this invention comprises triangular shaped pontoon 24 and column 23.

FIG. 3 is an isometric view of a platform in an embodiment of this invention without topsides, wind turbine, or mooring.

FIG. 4 is a top plan view of a platform in an embodiment of this invention without topsides, wind turbine, or mooring.

Figure 5:
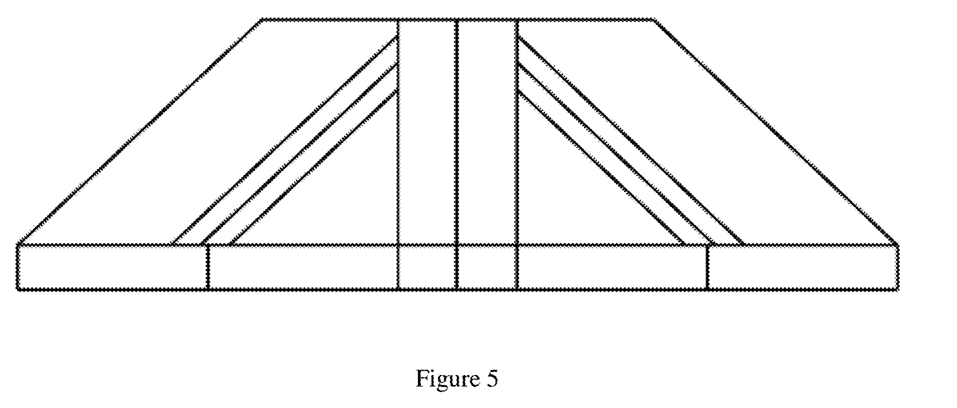
FIG. 5 is an elevation view of the platform without topsides, wind turbine, or mooring.

FIG. 5 is an elevation view of a platform in an embodiment of this invention without topsides, wind turbine, or mooring.

Figure 6:
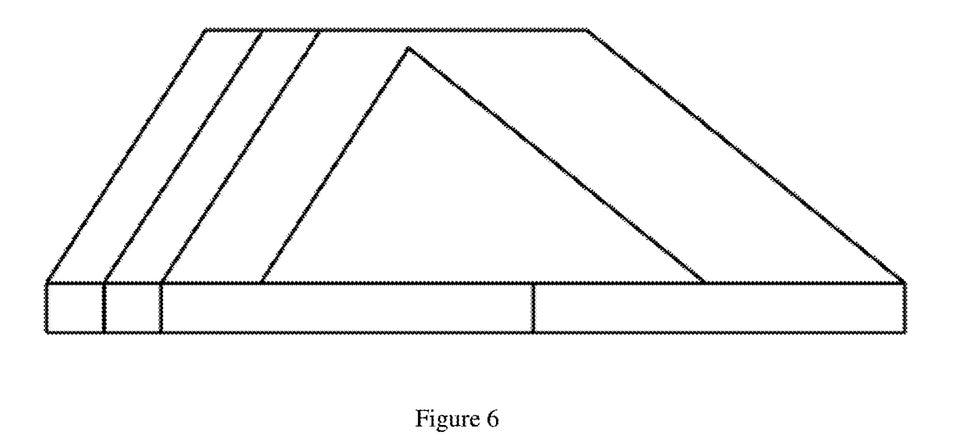
FIG. 6 is another elevation view of the platform without topsides, wind turbine, or mooring.

FIG. 6 is another elevation view of a platform in an embodiment of this invention without topsides, wind turbine, or mooring.

Figure 7:
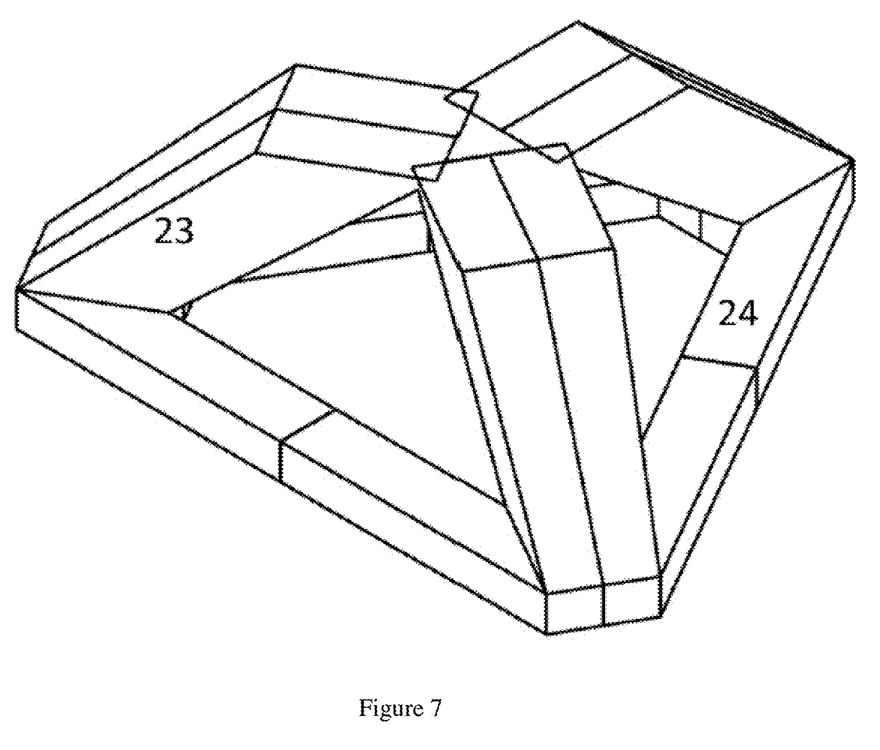
FIG. 7 is an isometric view of a tapered column platform without topsides, wind turbine, or mooring.

FIG. 7 shows an isometric view of a tapered column platform in an embodiment of this invention without topsides, wind turbine, or mooring. This is another embodiment of the invention, which has tapered column with small sectional area on the bottom, and large sectional area on the top of column.

Figure 8:
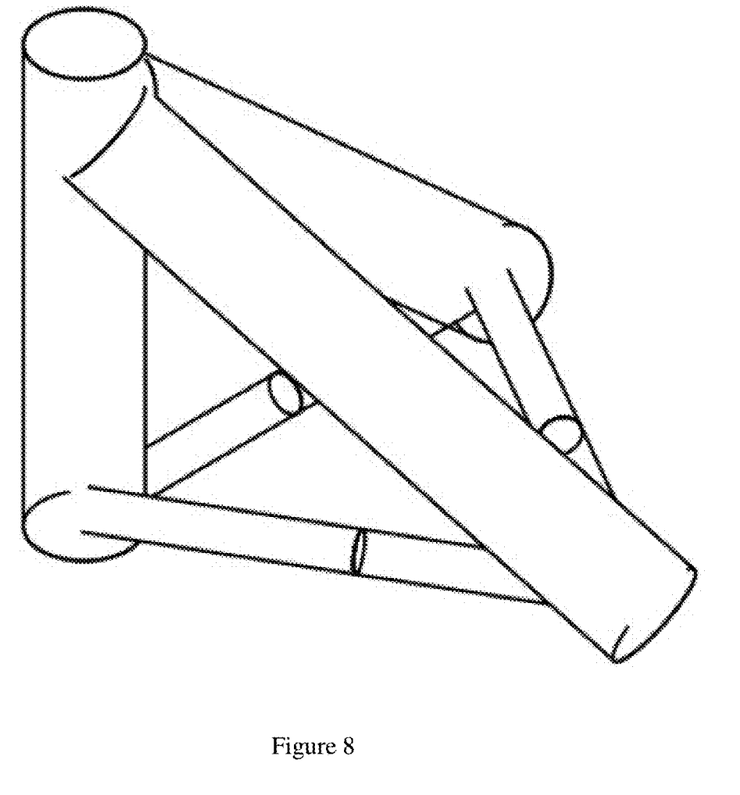
FIG. 8 shows a column with inclination angle less than 30 degrees from the vertical axis.

FIG. 8 shows another embodiment of the invention, which has the first column with inclination angle less than 30 degrees from the vertical axis. Two other columns incline towards the first column and connect with the column at or close to the top of column. In this embodiment, the floating platform is an asymmetrical structure which allows eccentric position of the tower in the platform. It also enables easier installation of a very high tower and turbine.

Figure 9:
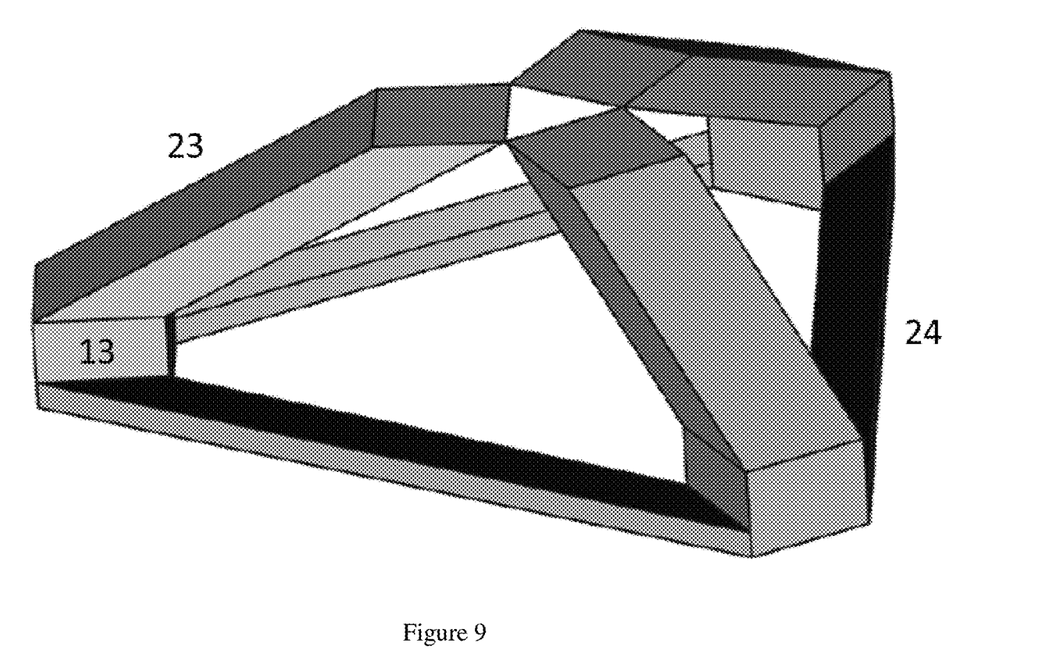
FIG. 9 shows a floating platform column with both vertical and canted portions.

FIG. 9 shows a floating platform column with both vertical and canted portions, which is another embodiment of the invention. It has vertical column between pontoon top until a location between ½ of the draft and ⅔ of the draft. The inclined column starts from the end of vertical column and converges to the center of platform, connecting with the other inclined columns.

In one embodiment, the floating platform of this invention has vertical tensioned lines as station-keeping in the center.

This invention further provides an installation method for the floating platforms. In one embodiment, the installation method of the platform has an in-line mooring tensioner for lines on one or more columns. In one embodiment where the floating platform has 3 columns, the mooring system of the platform contains mooring lines (chain, chain/wire, or chain/rope) with H links on 2 of the 3 columns Mooring lines on the last column contain an in line tensioner that can be used to tension up the mooring lines. There could be no fairleads, mooring winches or chain jacks.

FIG. 10 shows the first mooring line installed on a floating platform with mooring connectors.

Figure 11:
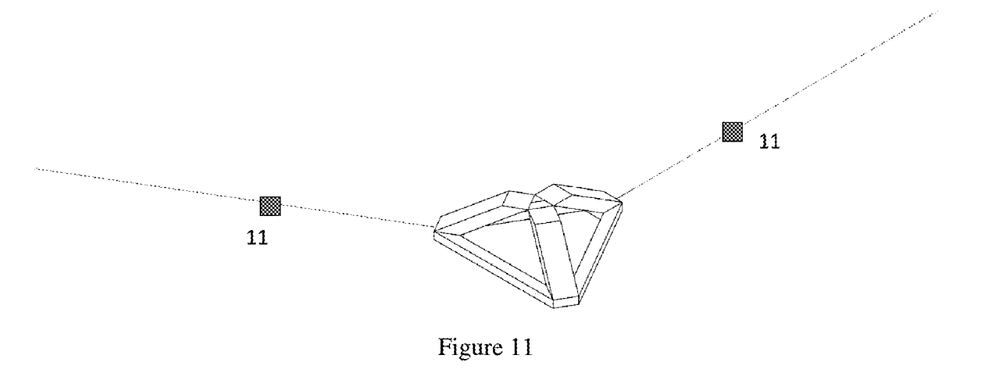
FIG. 11 shows the second mooring line installed on a floating platform with mooring connectors.

FIG. 11 shows the second mooring line installed on a floating platform with mooring connectors.

FIG. 12 shows the third mooring line installed on a floating platform with special in line mooring tensioner or similar mooring connectors.

Figure 13:
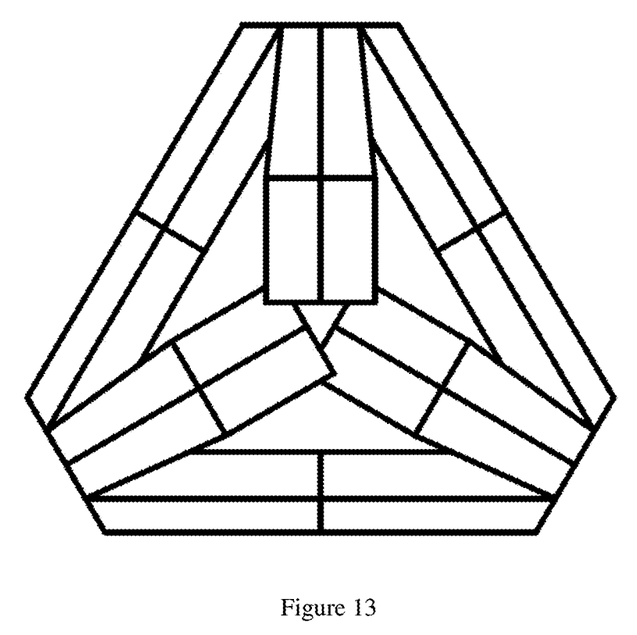
FIG. 13 shows another embodiment of the invention, which has the pontoon section width exceeding the column section. In other words, the pontoon width is not geometrically associated with the column section shape. This allows more added mass due to increased pontoon size and consequently changes natural period of the platform.

FIG. 13 shows another embodiment of the invention, which has the pontoon section width exceeding the column section. In other words, the pontoon width is not geometrically associated with the column section shape.

Figure 14:
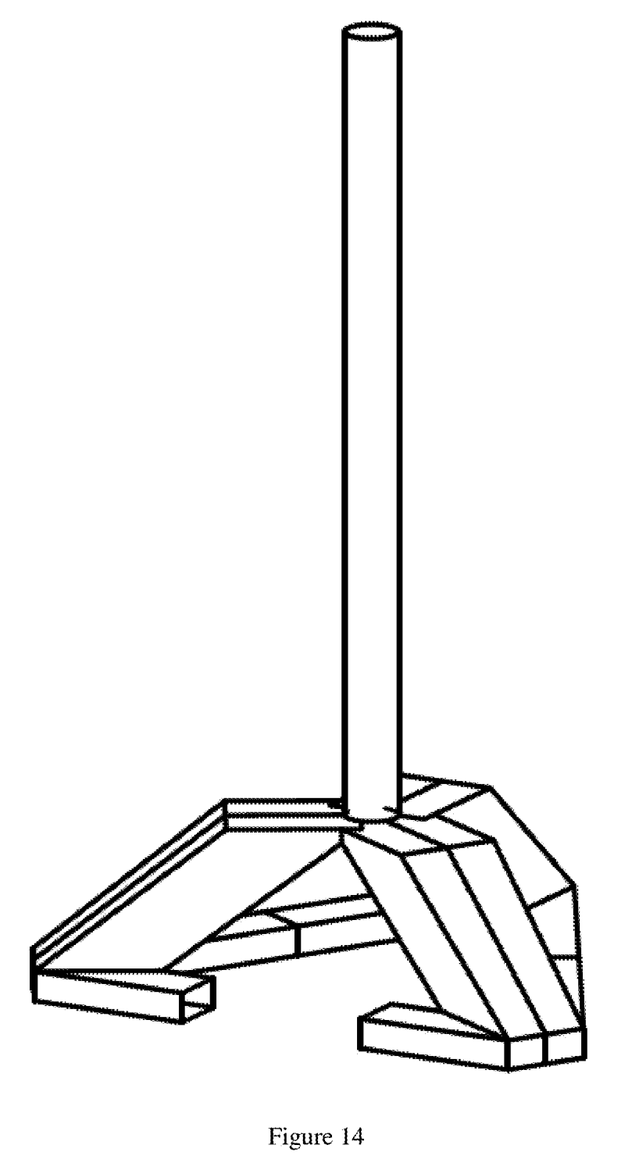
FIG. 14 shows a method to install wind turbine on such a platform. A portion of pontoon is not installed or removed for access of a lifting device. After the turbine is installed, the remaining pontoon section is put back. Lifting capability is limited by both the reach angle and height. This method allows the lifting device to increase the lifting angle to horizontal plane, and hence reduces the requirement to the lifting device. It is generally applicable to all center positioned tower or topsides.

FIG. 14 shows a method to install a wind turbine on such platform. A portion of a pontoon is not installed or removed for access of a lifting device. After the turbine is installed, the remaining pontoon section is put back.

Figure 15:
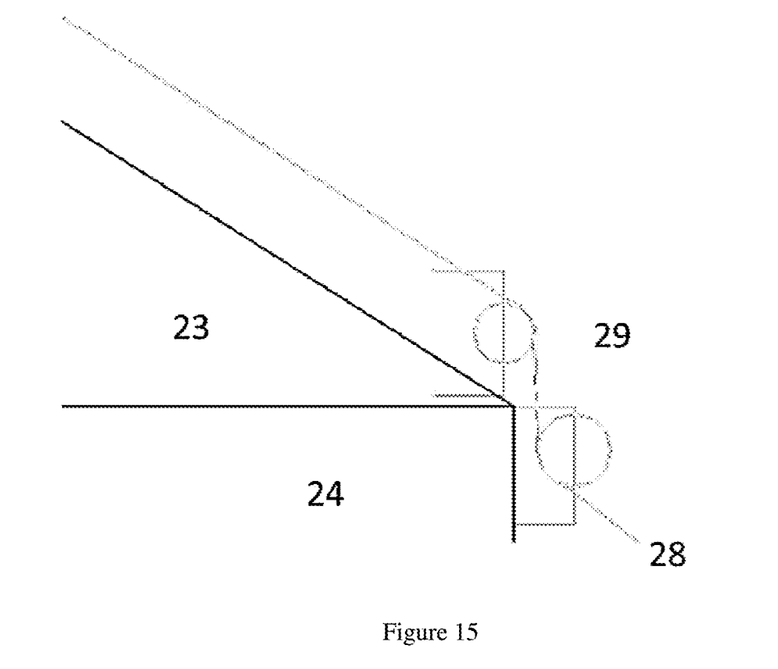
FIG. 15 shows another embodiment of the invention having double wheel fairlead installed on the canted column to allow permanent or temporary mooring line tensioning device (winch, chain jack or other devices) on the platform. In this embodiment, mooring line 28 passes through fairlead 29 which has one additional wheel to allow the line to make a turn. The top and bottom wheels are supported and rotate about the same axis. The axis can be vertical or inclined.
Figure 16:
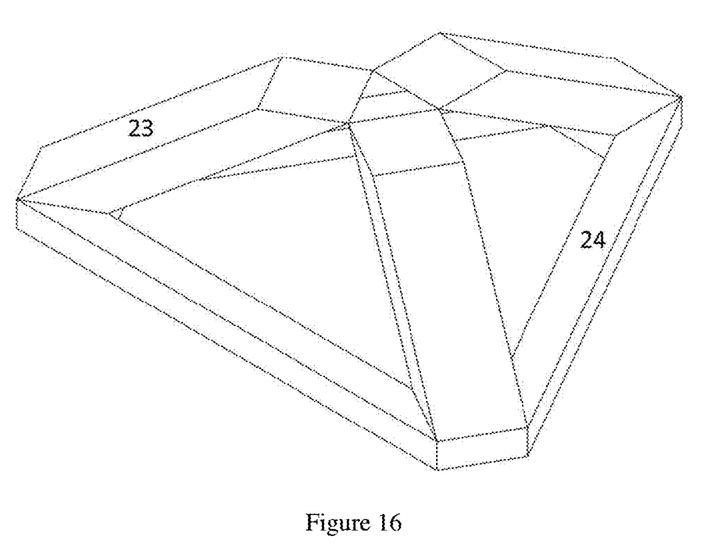
FIG. 16 is an isometric view of the platform without topsides, wind turbine, or mooring.
Figure 17:
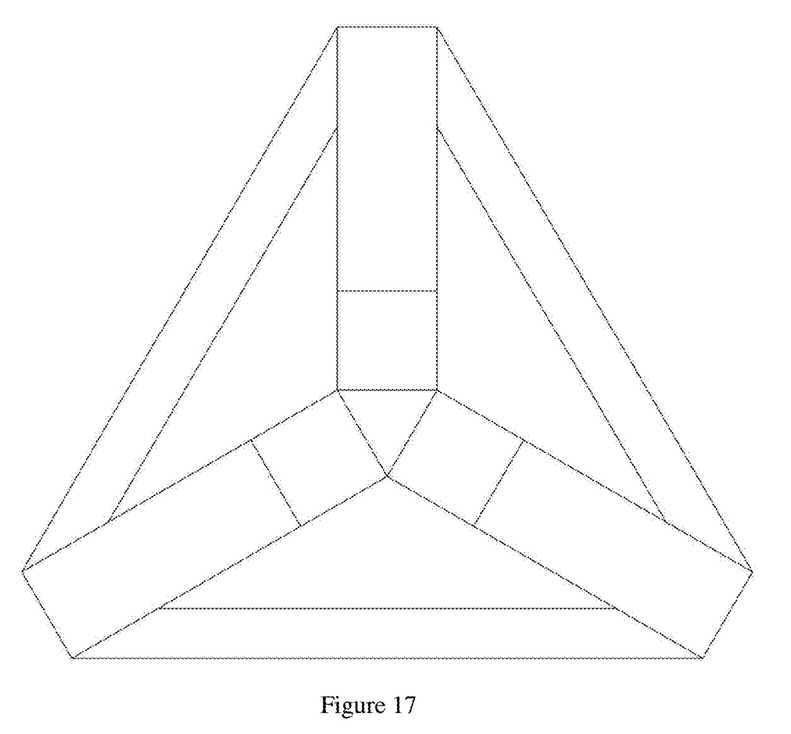
FIG. 17 is a top plan view of the platform without topsides, wind turbine, or mooring.
Figure 18:
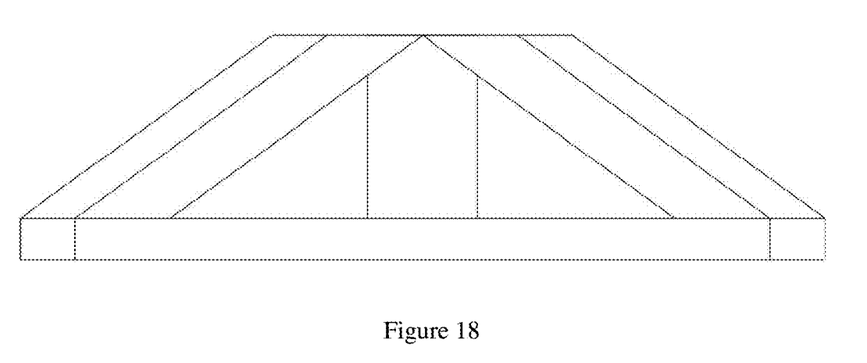
FIG. 18 is an elevation view of the platform without topsides, wind turbine, or mooring.
Figure 19:
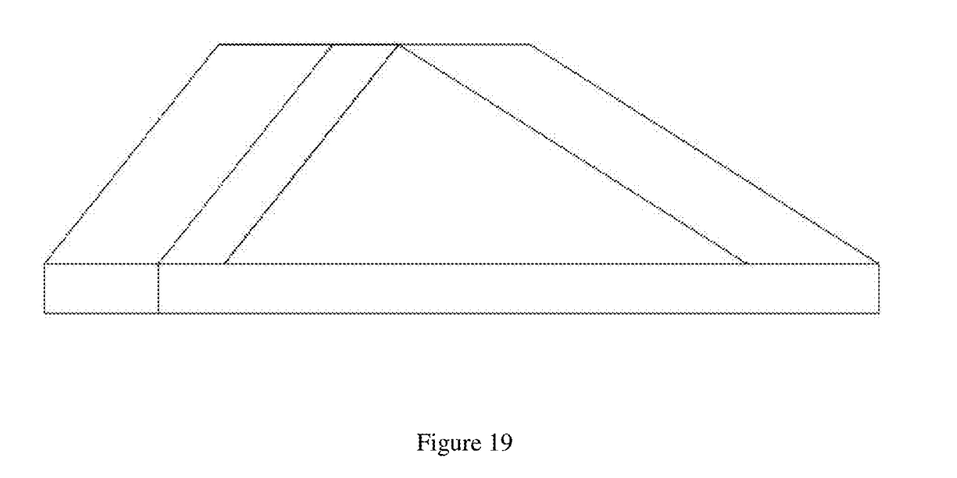
FIG. 19 is another elevation view of the platform without topsides, wind turbine, or mooring.
Figure 20:
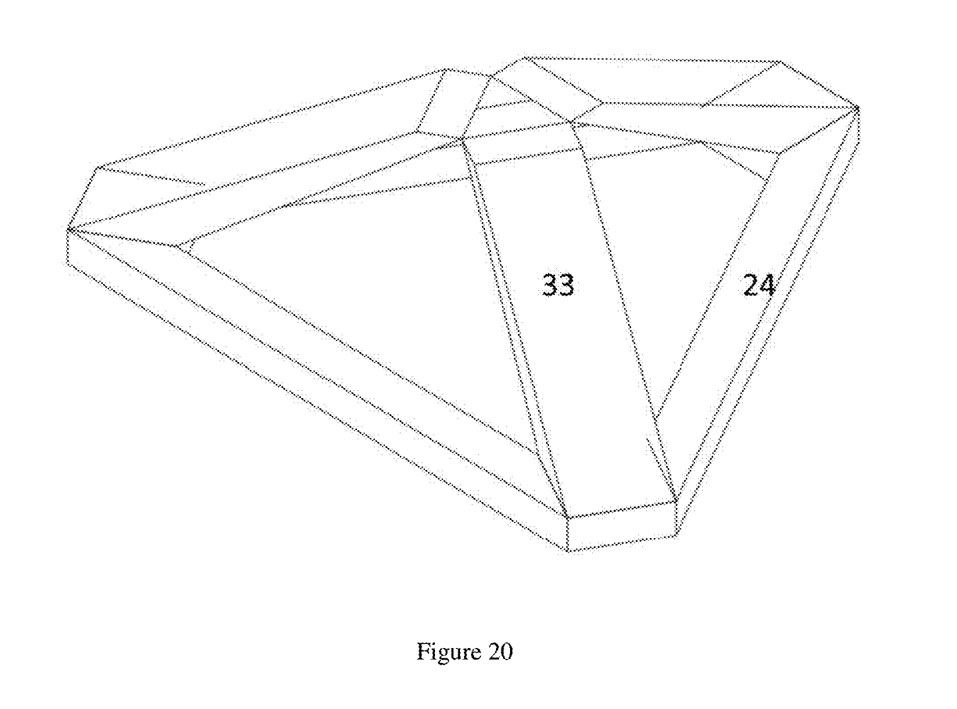
FIG. 20 is an isometric view of a tapered column platform without topsides, wind turbine, or mooring.

FIG. 15 shows a double fairlead used for the platform in an embodiment of this invention.

The present invention provides a floating platform. In one embodiment, the floating platform of this invention comprises: (a) at least 3 columns (23), wherein each of said at least 3 columns comprises an upper end and a lower end; (b) at least 3 pontoons (24), wherein each of said at least 3 pontoons comprises a left end and a right end; wherein, each of said at least 3 columns is connected to two adjacent columns of said at least 3 columns at said upper end to converge and form a surface for supporting of a topside, each of said at least 3 pontoons is horizontally disposed with said left end and right end separately connected to the lower ends of two adjacent columns of said at least 3 columns to form a closed hull structure whereby one or more of said at least 3 columns are canted or inclined inward.

In one embodiment, one of said at least 3 columns is inclined at an acute angle from a vertical axis.

In one embodiment, each of said at least 3 columns at said upper end overlap with two adjacent columns.

In one embodiment, one or more of said at least 3 columns or 3 pontoons have a cross section that is substantially rectangular.

In one embodiment, one or more of said at least 3 pontoons is circular in shape.

In one embodiment, one or more of said at least 3 columns is circular in shape.

The columns of this invention can be shaped to reduce the vortex induced motion (VIM). In one embodiment, one or more of said at least 3 columns is triangle in shape.

In one embodiment, one or more of said at least 3 pontoons is triangle in shape.

In one embodiment, said acute angle is at 30, 50, or 70 degrees.

In one embodiment, said floating platform further comprises vertical tensioned lines.

The columns of this invention can be shaped to improve stability of the platform. In one embodiment, one or more of said at least 3 columns are tapered columns (33) having a small sectional area at said lower end, and a large sectional area at said upper end.

In one embodiment, one or more of said at least 3 columns are tapered columns (33) having a large sectional area at said lower end, and a small sectional area at said upper end.

In one embodiment, said at least 3 pontoons or columns are made of a material selected from the group consisting of concrete, steel, or a combination of both.

In one embodiment, one of said at least 3 columns is inclined within 30 degrees from a vertical axis.

In one embodiment, one or more of said at least 3 columns comprises a vertical portion (13) and a canted portion (23).

In one embodiment, said floating platform comprises 3 columns.

In one embodiment, said floating platform comprises 4 columns.

The pontoons of this invention can be designed to optimize the natural period of the floating platform to suit its purpose. In one embodiment, the pontoon width is not geometrically associated with the column section shape. In another embodiment, one or more of said at least 3 pontoons have a width exceeding column. This allows more added mass due to increase pontoon size and consequently changes natural period of the platform and improve the performance of the platform.

In one embodiment, said one or more of said at least 3 pontoons have a portion that can be removed.

In one embodiment, said floating platform further comprises a double wheel fairlead (29).

The present invention further provides a method of installing the floating platform of this invention. In one embodiment, the method of installing said floating platform, comprises the steps of: (a) providing a mooring system comprising mooring lines and connection devices; (b) installing one of said connection devices on each of said at least 3 columns except for a last column; (c) mooring all said columns installed with connection device in step (b) with said mooring lines one by one; and (d) installing a line tensioning device on said last column and tensioning up all of said mooring lines to a desired tension.

In one embodiment, said method is used for a floating platform comprising 3 columns.

In one embodiment, said method is used for a floating platform comprising 4 columns.

This invention further provides a method of installing a turbine or small foot print topsides on said floating platform of this invention. A portion of one of the pontoons is not installed or removed for access of a lifting device. After the turbine is installed, the remaining portion of the pontoon is put back. Lifting capability is limited by both the reach angle and height. This method allows the lifting device to increase the lifting angle to horizontal plane, and hence reduce the requirement to lifting device. It is generally applicable to all center positioned tower or topsides.

In one embodiment, said method comprises comprising the steps of: (a) Constructing said floating platform, wherein said one or more of said at least 3 pontoons have a portion that can be removed; (b) Removing said portion of one of said at least 3 pontoons (24); (c) Accessing center of the floating platform with a lifting device; (d) Lifting said turbine or small foot print topsides onto said surface for supporting of a topside; and (e) Removing said lifting device, and putting said portion of one of said at least 3 pontoons (24) in place.

In one embodiment, the installation method of this invention is for floating platforms having 3 columns.

In one embodiment, the installation method of this invention is for floating platforms having 4 columns.

Those skilled in the art will readily appreciate that the specific examples in this specification are for illustrative purposes only and should not limit the scope of the invention which is defined by the claims which follow thereafter.

It is to be noted that the transitional term "comprising", which is synonymous with "including", "containing" or "characterized by", is inclusive or open-ended and does not exclude additional, un-recited elements or method steps.

What is claimed is:

1. A floating platform, comprising:
   a. at least 3 columns (23), wherein each of said at least 3 columns comprises an upper end and a lower end;

b. at least 3 pontoons (24), wherein each of said at least 3 pontoons comprises a left end and a right end;

wherein, each of said at least 3 columns is connected to two adjacent columns of said at least 3 columns at said upper end to converge and form a surface for supporting of a topside, each of said at least 3 pontoons is horizontally disposed with said left end and right end separately connected to the lower ends of two adjacent columns of said at least 3 columns to form a closed hull structure whereby one or more of said at least 3 columns are canted or inclined inward; wherein one of said at least 3 columns is inclined at an acute angle from a vertical axis.

2. The floating platform of claim 1, wherein each of said at least 3 columns at said upper end overlap with two adjacent columns.

3. The floating platform of claim 1, wherein one or more of said at least 3 columns or 3 pontoons have a cross section that is substantially rectangular.

4. The floating platform of claim 1, wherein one or more of said at least 3 pontoons or columns have a cross section that is circular or triangular in shape.

5. The floating platform of claim 1, wherein said acute angle is at 30, 50, or 70 degrees.

6. The floating platform of claim 1, wherein said floating platform further comprises vertical tensioned lines.

7. The floating platform of claim 1, wherein one or more or said at least 3 columns are tapered columns (33) having a small sectional area at said lower end, and a large sectional area at said upper end.

8. The floating platform of claim 1, wherein one or more of said at least 3 columns are tapered columns (33) having a large sectional area at said lower end, and a small sectional area at said upper end.

9. The floating platform of claim 1, said at least 3 pontoons or columns are made of a material selected from the group consisting of concrete, steel, or a combination of both.

10. The floating platform of claim 1, wherein one or more of said at least 3 columns comprises a vertical portion (13) and a canted portion (23).

11. The floating platform of claim 1, wherein said floating platform comprises 3 columns.

12. The floating platform of claim 1, wherein said floating platform comprises 4 columns.

13. The floating platform of claim 1, wherein one or more of said at least 3 pontoons have a width exceeding width of said at least 3 columns.

14. The floating platform of claim 1, wherein one or more of said at least 3 pontoons have a portion that can be removed.

15. A method of installing said floating platform of claim 1, comprising the steps of:
  a. providing a mooring system comprising mooring lines and connection devices;
  b. installing one of said connection devices on each of said at least 3 columns except for a last column;
  c. mooring all said columns installed with connection device in step (b) with said mooring lines one by one; and
  d. installing a line tensioning device on said last column and tensioning up all of said mooring lines to a desired tension.

16. The method of claim 15, wherein said floating platform comprises 3 columns.

17. The method of claim 15, wherein said floating platform comprises 4 columns.

18. A method of installing a turbine or topside on said floating platform of claim 1, comprising the steps of:
  a. Constructing said floating platform, wherein one or more of said at least 3 pontoons have a portion that can be removed;
  b. Removing said portion of one of said at least 3 pontoons (24);
  c. Accessing center of the floating platform with a lifting device;
  d. Lifting said turbine or topside onto said surface for supporting of a topside; and
  e. Removing said lifting device, and putting said portion of one of said at least 3 pontoons (24) in place.

19. The method of claim 17, wherein said floating platform comprises 3 columns.

20. The method of claim 17, wherein said floating platform comprises 4 columns.

\* \* \* \* \*